US011093109B2

(12) United States Patent
Anderson et al.

(10) Patent No.: US 11,093,109 B2
(45) Date of Patent: Aug. 17, 2021

(54) TECHNOLOGIES FOR COMPUTING CONTEXT REPLAY WITH VISUAL SEARCHING

(71) Applicant: Intel Corporation, Santa Clara, CA (US)

(72) Inventors: Glen J. Anderson, Beaverton, OR (US); Jose K. Sia, Jr., Portland, OR (US); Dawn Nafus, Hillsboro, OR (US); Carl S. Marshall, Portland, OR (US); Jeffrey R. Jackson, Newberg, OR (US); Heather Patterson, Santa Clara, CA (US); John W. Sherry, Portland, OR (US); Daniel S. Lake, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 978 days.

(21) Appl. No.: 14/866,179

(22) Filed: Sep. 25, 2015

(65) Prior Publication Data
US 2017/0090688 A1 Mar. 30, 2017

(51) Int. Cl.
*G06F 3/0482* (2013.01)
*G06F 9/455* (2018.01)
(Continued)

(52) U.S. Cl.
CPC ........ *G06F 3/0482* (2013.01); *G06F 3/04842* (2013.01); *G06F 8/71* (2013.01);
(Continued)

(58) Field of Classification Search
CPC ...... G06F 11/14; G06F 3/048; G06F 11/1484; G06F 9/45533; G06F 9/455; G06F 3/0482; G06F 16/188; G06F 12/02; G06F 16/178
See application file for complete search history.

(56) References Cited

U.S. PATENT DOCUMENTS 6,670,974 B1 12/2003 McKnight et al.
7,856,424 B2 12/2010 Cisler et al.
(Continued)

FOREIGN PATENT DOCUMENTS

WO 2008-154171 12/2008

OTHER PUBLICATIONS

International Search Report for PCT/US16/048599, dated Nov. 30, 2016 (3 pages).
(Continued)

*Primary Examiner* — Sang H Kim
(74) *Attorney, Agent, or Firm* — Hanley, Flight & Zimmerman, LLC

(57) ABSTRACT

Technologies for computing context replay include a computing device having a persistent memory and a volatile memory. The computing device creates multiple snapshots that are each indicative of a user's computing context at a corresponding sync point. The snapshots may include metadata created in response to system events, memory snapshots stored in a virtual machine, and/or video data corresponding to the computing context. At least a part of the snapshots are stored in the persistent memory. The computing device presents a timeline user interface based on the snapshots. The timeline includes multiple elements that are associated with corresponding sync points. The timeline elements may visually indicate a salience value that has been determined for each corresponding sync point. In response to a user selection of a sync point, the computing device activates a computing context corresponding to the snapshot for the selected sync point. Other embodiments are described and claimed.

24 Claims, 5 Drawing Sheets

(51) Int. Cl.
*G06F 3/0484* (2013.01)
*G06F 16/11* (2019.01)
*G06F 16/178* (2019.01)
*G06F 8/71* (2018.01)

(52) U.S. Cl.
CPC ........ *G06F 9/45558* (2013.01); *G06F 16/128* (2019.01); *G06F 16/178* (2019.01); *G06F 2009/45562* (2013.01); *G06F 2009/45575* (2013.01); *G06F 2009/45583* (2013.01)

(56) References Cited

U.S. PATENT DOCUMENTS

| | | | |
|---|---|---|---|
| 8,010,900 B2* | 8/2011 | Hart | G06F 11/1448 715/747 |
| 8,166,415 B2 | 4/2012 | Cisler et al. | |
| 8,484,569 B2 | 7/2013 | Carlson et al. | |
| 8,538,927 B2 | 9/2013 | Cisler et al. | |
| 8,645,912 B2 | 2/2014 | Welchman et al. | |
| 9,360,995 B2 | 6/2016 | Hart et al. | |
| 9,734,021 B1* | 8/2017 | Sanocki | H04L 41/0654 |
| 2008/0022032 A1* | 1/2008 | Nicholas | G06F 9/45558 711/100 |
| 2008/0034013 A1 | 2/2008 | Cisler et al. | |
| 2008/0034307 A1 | 2/2008 | Cisler et al. | |
| 2008/0307000 A1* | 12/2008 | Paterson | G06F 3/0484 |
| 2008/0307017 A1* | 12/2008 | Lyons | G06F 11/1469 |
| 2008/0307345 A1 | 12/2008 | Hart et al. | |
| 2010/0077165 A1* | 3/2010 | Lu | G06F 11/1451 711/162 |
| 2011/0016089 A1 | 1/2011 | Freedman | |
| 2011/0023019 A1* | 1/2011 | Aniszczyk | G06F 9/45504 717/128 |
| 2011/0083098 A1* | 4/2011 | Cisler | G06F 9/451 715/784 |
| 2011/0302502 A1 | 12/2011 | Hart et al. | |
| 2012/0005596 A1 | 1/2012 | Carlson | |
| 2012/0054715 A1 | 3/2012 | Welchman | |
| 2014/0095823 A1* | 4/2014 | Shaikh | G06F 16/188 711/165 |
| 2014/0195480 A1* | 7/2014 | Talagala | G06F 12/0804 707/610 |
| 2016/0246458 A1 | 8/2016 | Hart et al. | |

OTHER PUBLICATIONS

Written Opinion for PCT/US16/048599, dated Nov. 30, 2016 (7 pages).
The International Bureau of WIPO, "International Preliminary Report on Patentability," issued in connection with International Patent Application No. PCT/US2016/048599, dated Mar. 27, 2018, 8 pages.

* cited by examiner

TECHNOLOGIES FOR COMPUTING CONTEXT REPLAY WITH VISUAL SEARCHING

BACKGROUND

Typical computing systems include volatile memory such as random-access memory (RAM) coupled to persistent data storage such as hard disk drives or solid-state drives. Volatile memory requires a power source for operation; the contents of volatile memory may be lost when the power supply to a computing system is turned off. Persistent, or nonvolatile, storage retains its contents while power to the computing system is turned off.

Some computing systems include persistent memory, which may be byte-addressable, high-performance, non-volatile memory. Persistent memory may provide performance comparable to traditional volatile random access memory (RAM) while also providing data persistence. Computing systems may use persistent memory for program execution and data storage.

Current backup and versioning systems may allow a user to recover or revert to previous versions of a file. Typically, to restore data, the user launches a specialized restore program and then selects the data to be restored (e.g., a file, a directory, a previous system configuration, etc.). Restoring the data may be time-consuming or intrusive, and may require rebooting the system. For example, Microsoft® Windows™ allows the user to restore a previous system configuration (e.g., the operating system, OS drivers, and settings) by selecting from one or more saved checkpoints in a specialized restore tool. As another example, Apple® Time Machine® provides a visual navigation system allowing a user to browse and select previous versions of a file that were saved to disk. Lifestreaming services such as the former Jaiku service recorded a messaging stream across multiple web applications. Jaiku did not store local interactions with applications, documents, or files.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
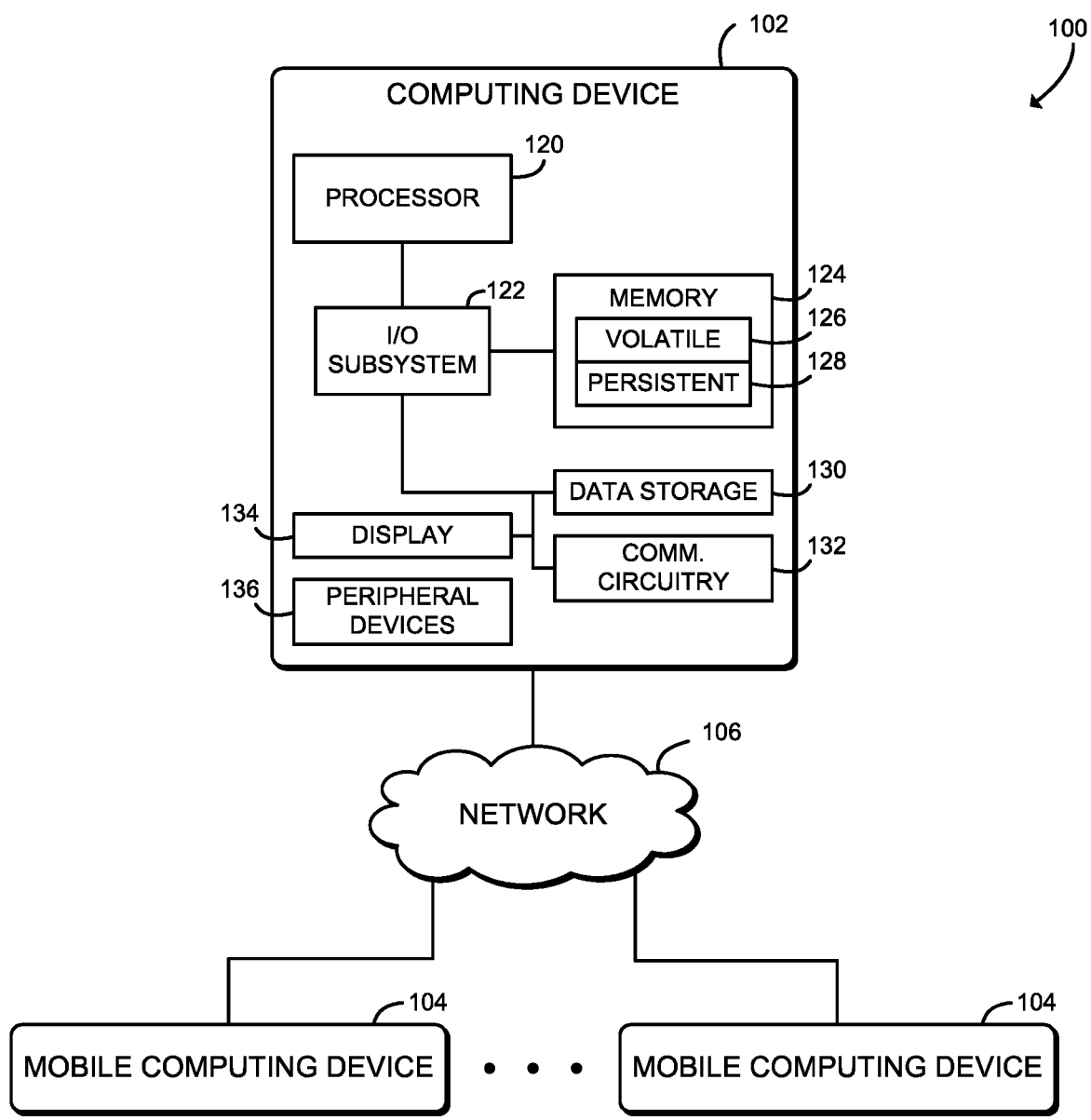
FIG. 1 is a simplified block diagram of at least one embodiment of a computing device for user computing context replay.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or nonvolatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 includes a computing device 102 having both volatile and persistent memory. The system 100 may include additional mobile computing devices 104, which may be in communication with the computing device 102 over a network 106. In use, as discussed in more detail below, the computing device 102 creates multiple snapshots of a user's computing context as the user performs computing tasks. The computing context may include application state (e.g., document contents, application events, window positions, etc.) as well as other contextual data such as input device data, sensor data, network resources, and other data. The computing context may include contextual data generated by the computing device 102 as well as contextual data generated by other devices in addition to the computing device 102, such as the mobile computing devices 104. The computing device 102 presents a visual timeline representation of the stored snapshots, and the user may use the visual timeline to search, filter, navigate, and otherwise select previous snapshots. The computing device 102 may restore a previous computing context from a snapshot in response to a user selection. Thus, the system 100 may allow a user to revert to previous computing contexts simply and completely, without being limited to reverting file versions. Additionally, browsing and restoration of previous data may be integrated with the user's normal workflow. Also, by using a visual timeline with visual searching and indexing, the system 100 may take advantage of human visual memory.

The computing device 102 may be embodied as any type of computing device capable of performing the functions described herein, including, without limitation, a computer, a laptop computer, a notebook computer, a tablet computer, a smartphone, a mobile computing device, a wearable computing device, a multiprocessor system, a server, a rack-mounted server, a blade server, a network appliance, a web appliance, a distributed computing system, a processor-based system, and/or a consumer electronic device. As shown in FIG. 1, the computing device 102 includes a processor 120, an input/output subsystem 122, a memory 124, a data storage device 130, and communication circuitry 132. Of course, the computing device 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in one or more processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or nonvolatile memory or data storage capable of performing the functions described herein. In operation, the memory 124 may store various data and software used during operation of the computing device 102 such as operating systems, applications, programs, libraries, and drivers.

The memory 124 further includes volatile memory 126 and persistent memory 128. The volatile memory 126 may be embodied as traditional RAM, meaning that any data contained in the volatile memory 126 is lost when power is removed from the computing device 102 and/or the volatile memory 126. The persistent memory 128 may be embodied as any byte-addressable, high-performance, nonvolatile memory. For example, the persistent memory 128 may be embodied as battery-backed RAM, phase-change memory, spin-transfer torque RAM, resistive RAM, memristor-based memory, or other types of persistent memory. The persistent memory 128 may include programs and data similar to the volatile memory 126; however, the contents of the persistent memory 128 are retained for at least some period of time when power is removed from the computing device 102 and/or the persistent memory 128. In some embodiments, the memory 124 may include only persistent memory 128; however, in those embodiments a portion of the persistent memory 128 may be used to store volatile data similar to volatile memory 126.

The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. Access to the data storage device 130 may be much slower than to the persistent memory 128. Additionally, the data storage device 130 may be accessed through a block device, file system, or other non-byte-addressable interface.

The communication circuitry 132 of the computing device 102 may be embodied as any communication circuit, device, or collection thereof, capable of enabling communications between the computing device 102, the mobile computing devices 104 and/or other remote devices over the network 106. The communication circuitry 132 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 102 may also include a display 134 and one or more peripheral devices 136. The display 134 may be embodied as any type of display capable of displaying digital information such as a liquid crystal display (LCD), a light emitting diode (LED), a plasma display, a cathode ray tube (CRT), or other type of display device. As described below, the display 134 may be used to display a user interface for browsing, searching, and otherwise navigating stored snapshots or to display other information to the user of the computing device 102.

The peripheral devices 136 may include any number of additional input/output devices, interface devices, and/or other peripheral devices. For example, in some embodiments, the peripheral devices 136 may include a touch screen, graphics circuitry, keyboard, mouse, speaker system, microphone, network interface, and/or other input/output devices, interface devices, and/or peripheral devices.

Each of the mobile computing devices 104 may be configured to provide user computing context data to the computing device 102 as described further below. Each mobile computing device 104 may be embodied as any type of computation or computer device capable of performing the functions described herein, including, without limitation, a computer, a smart phone, an embedded computing device, a tablet computer, a laptop computer, a notebook computer, a wearable computing device, an in-vehicle infotainment system, a multiprocessor system, a network appliance, a web appliance, a distributed computing system, a processor-based system, and/or a consumer electronic device. Thus, the mobile computing device 104 includes components and devices commonly found in a smart phone or similar computing device, such as a processor, an I/O subsystem, a memory, a data storage device, and/or communication circuitry. Those individual components of the mobile computing device 104 may be similar to the corresponding components of the computing device 102, the description of which is applicable to the corresponding components of the mobile computing device 104 and is not repeated herein so as not to obscure the present disclosure. Additionally, although illustrated in FIG. 1 as being in communication with multiple mobile computing devices 104, it should be appreciated that the computing device 102 may also communicate with other computing devices such as servers, desktop computers, workstations, or other primarily stationary devices.

As discussed in more detail below, the computing device 102 and the mobile computing devices 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
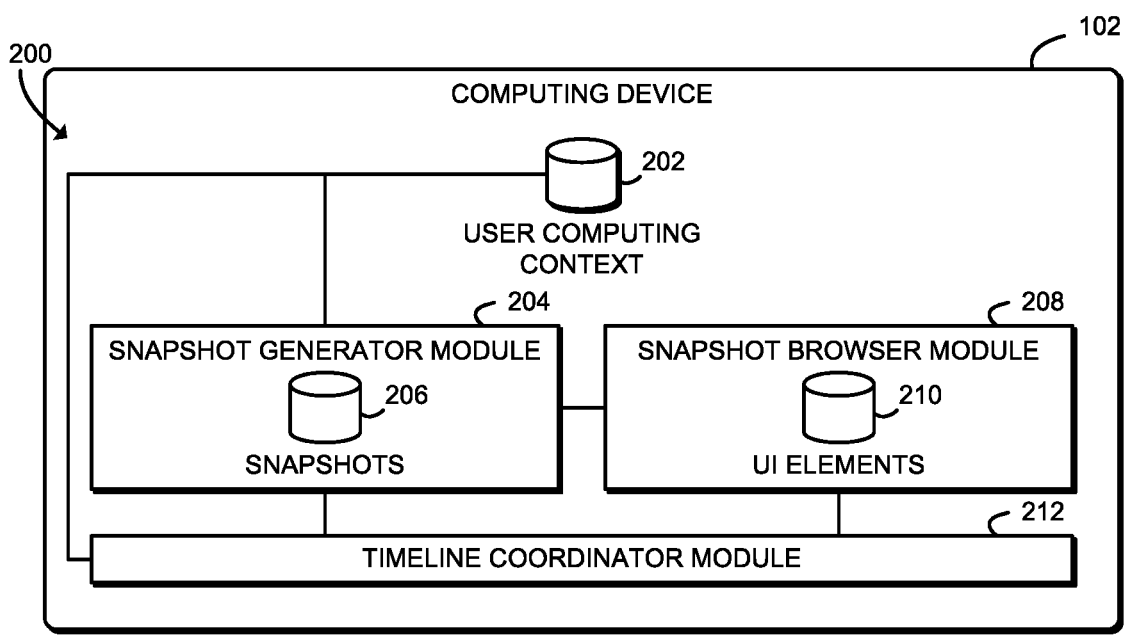
FIG. 2 is a simplified block diagram of at least one embodiment of an environment of the computing device of FIG. 1.

Referring now to FIG. 2, in an illustrative embodiment, the computing device 102 establishes an environment 200 during operation. The illustrative environment 200 includes a user computing context 202, a snapshot generator module 204, a snapshot browser module 208, and a timeline coordinator module 212. The various modules of the environment 200 may be embodied as hardware, firmware, software, or a combination thereof. For example, one or more of the modules, logic, and other components of the environment 200 may form a portion of, or otherwise be established or executed by, the processor 120 or other hardware components of the computing device 102. As such, in some embodiments, any one or more of the modules of the environment 200 may be embodied as a circuit or collection of electrical devices (e.g., a snapshot generator circuit 204, a snapshot browser circuit 208, etc.).

The user computing context 202 may be embodied as any data indicative of the current computing environment of the user, including open applications, documents, windows, and other user interface elements. The user computing context 202 may include data relating to applications and content accessed by the user on the computing device 102, as well as on remote devices such as the mobile computing devices 104.

The snapshot generator module 204 is configured to create multiple snapshots 206. Each of the snapshots 206 is indicative of the user computing context 202 at a corresponding sync point (that is, a corresponding point in time). The snapshot generator module 204 is further configured to store at least a part of snapshots 206 in the persistent memory 128. The snapshot generator module 204 may be configured to create snapshots 206 by logging metadata associated with user-interaction events of the user computing context 202, creating virtual machine memory snapshots, or capturing video data indicative of the user computing context 202. The temporal resolution of the snapshots 206 may decrease for snapshots 206 that are further back in time.

The snapshot browser module 208 is configured to present a timeline user interface based on the snapshots 206. The timeline user interface includes several user interface elements 210 such as timeline scrubbers, thumbnails, date pickers, or other elements. Each user interface element 210 is associated with a corresponding sync point and thus with a corresponding snapshot 206. Each user interface element 210 of the timeline user interface may include a visual representation such as a thumbnail image or video of the corresponding snapshot 206. The snapshot browser module 208 is further configured to receive a user selection that is indicative of a selected sync point. In some embodiments, the snapshot browser module 208 may be configured to analyze the snapshots 206 to determine salience values associated with the sync points corresponding to the snapshots 206. In those embodiments, the timeline user interface may display a visual indication of the salience value associated with each sync point. In some embodiments, the snapshot browser module 208 may be configured to stream or pre-load snapshots 206 based on user navigation commands. The snapshot browser module 208 may be configured to select a second snapshot 206 based on the selected snapshot 206 (such as an adjacent snapshot 206) and then load the second snapshot 206 from the persistent memory 128 into the volatile memory 126.

The timeline coordinator module 212 is configured to activate the user computing context 202 that corresponds to snapshot 206 selected by the user. Activating the user computing context 202 may include loading the computing context 202 from the persistent memory 128 into the volatile memory 126. The timeline coordinator module 212 may be configured to activate the user computing context 202 by replaying the metadata stored in the selected snapshot 206, loading the virtual machine memory snapshot of the selected snapshot 206, or displaying the video data corresponding to the selected snapshot 206. In some embodiments, the timeline coordinator module 212 may be configured to transfer data from the selected user computing context 202 to a currently executing user computing context 202.

Figure 3:
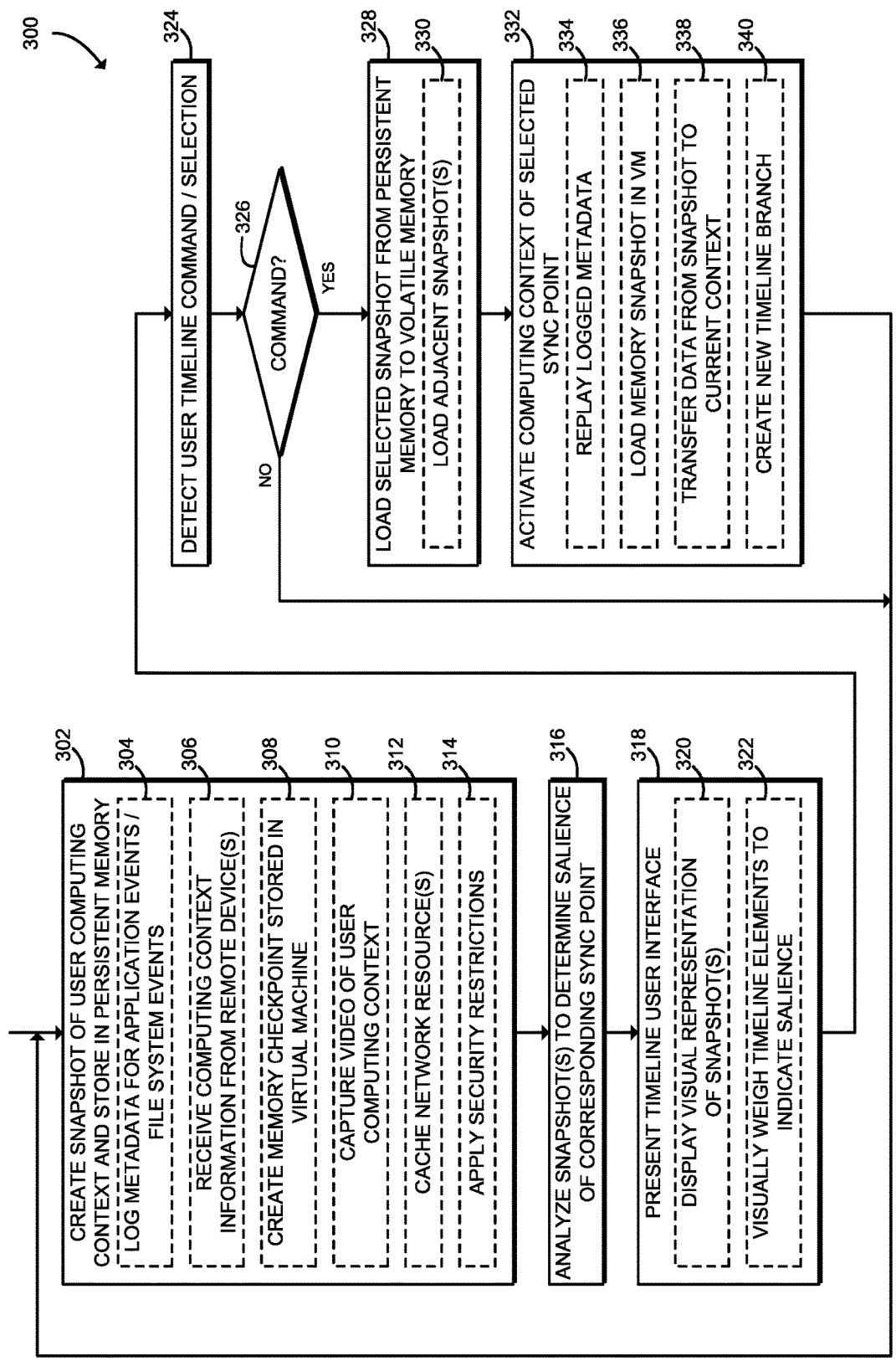
FIG. 3 is a simplified flow diagram of at least one embodiment of a method for user computing context replay that may be executed by the computing device of FIGS. 1 and 2.

Referring now to FIG. 3, in use, the computing device 102 may execute a method 300 for user computing context replay. The method 300 begins in block 302, in which the computing device 102 creates a snapshot 206 of the current user computing context 202 and stores at least a part of the snapshot 206 in the persistent memory 128. Each snapshot 206 corresponds to the user computing context 202 at a particular sync point (i.e., a particular date and time). The user computing context 202 may include any state data, input data, sensor data, or other data indicative of the current computing environment of the user, including open applications, documents, windows, and other user interface elements. Thus, the user computing context 202 may include the applications currently in use by the user, sensor data received by the computing device 102, location data, motion sensing data, document and file versions, operating system document or window focus, and other contextual information. The computing device 102 may create snapshots 206 periodically, continually, or responsively. For example, the computing device 102 may create snapshots 206 in response to certain system events or on any other appropriate schedule. The temporal resolution of the snapshots 206 may decrease for sync points further back in time. Thus, sync points could be fine-grained (e.g., occurring seconds apart) for recent sync points or, as the timeline gets older (or the events less interesting) the sync points may be separated by larger amounts of time (e.g., hours or days apart). The computing device 102 may store the snapshot 206 using any appropriate format. Additionally, although in the illustrative embodiment at least a part of the snapshot 206 is stored in the persistent memory 128, it should be understood that in some embodiments the snapshot 206 may be stored in the volatile memory 126, the data storage device 130, or other storage area of the computing device 102.

In some embodiments, in block 304 the computing device 102 may store the snapshot 206 by logging metadata corresponding to events and/or actions generated in the user's computing environment. For example, the computing device 102 may log metadata in response to application events, file system events, or other user-interaction events. The events may be generated and/or monitored using one or more application programming interfaces (APIs) provided by an operating system or other operating environment of the computing device 102. For example, in some embodiments the computing device 102 may monitor for certain Windows™ API calls and store metadata in response to those API calls. The logged metadata may describe attributes of the user's computing environment including open documents, window placement, window focus, document versions, location, extracted text from individual documents (including the use of optical-to-character recognition to generate text), extracted images from individual documents, or other attributes. As described further below, to recreate a particular user computing context 202, the logged metadata may be replayed or otherwise applied to a known previous snapshot 206. The logged metadata may be stored in a database, which may be stored in the persistent memory 128, in the volatile memory 126, and/or stored across both the persistent memory 128 and the volatile memory 126.

In some embodiments, in block 306 the computing device 102 may receive computing context 202 information from one or more remote devices, such as a mobile computing device 104. The remote device context information may be indicative of events or user actions performed by the user with the remote device, including particular interactions with applications, documents or other content, messaging actions, as well as other factors such as device location, sensor data, connected Bluetooth devices, and other peripherals or input methods. The remote device events may correspond to one or more local applications of the computing device 102 that are capable of accessing the same data. For example, the computing device 102 may receive context information from a mobile computing device 104 indicating that the user has interacted with a particular image or other content, generated a message, or performed another interactive action. As another example, the computing device 102 may receive context information from an embedded connected device such as an Amazon™ Dash Button™, an Internet of Things (IoT) controller, or other embedded device. As still another example, the computing device 102 may receive sensor data from a remote device such as a fitness tracker, eye tracker, smart watch, or other sensor-enabled remote device.

In some embodiments, in block 308 the computing device 102 may store the snapshot 206 by creating a snapshot of the contents of the volatile memory 126 and storing the snapshot 206 in a virtual machine. The snapshot 206 thus may represent the entire contents of memory associated with the user computing environment and/or one or more applications of the user computing environment. The snapshot 206 may be created using a technique similar to the technique used by hypervisors to live-migrate virtual machines between hosts. For example, the computing device 102 may shim available virtual machine memory with write barriers to mark the memory as dirty. When the memory region has been marked dirty, its contents may be incrementally stored to the snapshot 206. Additionally, in some embodiments the snapshot 206 may also store a snapshot of disk contents. The snapshot 206 and/or containing virtual machine may be stored in the persistent memory 128. As described further below, to recreate a particular user computing context 202, a hypervisor, virtual machine monitor, or other supervisory component of the computing device 102 may restore the contents of memory from the snapshot 206 to the volatile memory 126.

In some embodiments, in block 310, the computing device 102 may capture video or other image data of the user computing context 202 in the snapshot 206. For example, the snapshot 206 may be embodied as or otherwise include a visual representation of the user's computing environment, such as a video screencast, still image screenshot, or other image data.

It should be understood that in some embodiments, the computing device 102 may store the snapshot 206 using any combination of metadata, memory snapshots, and video as described above in connection with blocks 304 through 310. For example, in some embodiments, the computing device 102 may store metadata describing incremental changes from a baseline memory snapshot. When the changes from the baseline snapshot become too large, the computing device 102 may create a new baseline memory snapshot.

In some embodiments, in block 312 the computing device 102 may cache one or more network resources such as web pages, files, or other remote data. The cached network resources may be stored for backup purposes, for example to be used if network resources cannot be accessed by the computing device 102 at a later time.

In some embodiments, in block 314 the computing device 102 may apply security restrictions to the user computing context 202 and/or the corresponding snapshot 206 data. The computing device 102 may prevent sensitive data such as passwords, secure websites, or digital rights management (DRM)-protected content from being stored in the snapshot 206. For example, in some embodiments, the computing device 102 may identify applications and/or windows containing sensitive data and exclude those windows or applications from the snapshot 206. In some embodiments, the computing device 102 may use a protected audio-video path or other protected output to prevent sensitive data from being stored in the snapshot 206.

In block 316, after storing a snapshot 206, the computing device 102 analyzes the snapshot(s) 206 to determine salience of the sync points corresponding to each of the snapshots 206. Salience may be determined as a measure of weighted importance to the user of a particular sync point, determined by characteristics of documents and usage factors. In some embodiments, salience may be based on visual analysis of the snapshots 206. For example, the computing device 102 may identify the snapshots 206 that include visual milestones, such as visually distinctive elements of applications and/or documents (e.g., large and/or distinctive images as compared to large blocks of text), as particularly salient. As another example, salience may be based on usage data, such as changes in the application receiving operating system focus, document operations, or other events.

In block 318, the computing device 102 presents a timeline user interface that allows a user to browse, search, or otherwise navigate through the snapshots 206 stored by the computing device 102. The timeline user interface includes several user interface elements 210. Each user interface element 210 corresponds to a particular sync point (i.e., a date and time) and thus may also correspond to a particular snapshot 206 stored for that sync point. In some embodiments, the computing device 102 may present the timeline interface in response to a user interface command, such as a particular button press, menu item selection, touch gesture, or other interface command. The computing device 102 may present the timeline user interface using any user interface modality. For example, the computing device 102 may present the timeline user interface as a graphical user interface using the display 134.

In some embodiments, in block 320 the computing device 102 may display visual representations corresponding to one or more of the stored snapshots 206. For example, each user interface element 210 may display one or more visual representations of the stored snapshots 206. The visual representation may be embodied as, for example, a full-sized or thumbnail image or video indicative of the user computing context 202 stored by the snapshot 206, an icon or other symbol indicative of an application, document, or other content of the user computing context 202, or other visual indicator of the user computing context 202. In some embodiments, in block 322, the computing device 102 may visually weigh timeline user interface elements 210 to indicate the salience of the associated sync point. For example, the computing device 102 may render more-salient user interface elements 210 in a larger size. In addition to salience, the computing device 102 may also use the user interface elements 210 to indicate other information associated with the sync points. For example, the computing device 102 may visually indicate a current application or current document characteristics of a sync point, such as versions of a document or related topics to the document. As another example, the computing device 102 may visually indicate usage factors relating to the use of the computing device 102 at the sync point, such as whether a document has been edited, the time spent by the user editing a document, the time spent with the operating system focus on each window, the nature of sharing of a document (e.g., which persons a document has been shared with, when a document is shared, versions that are shared), or other usage factors.

In block 324, the computing device 102 detects a user timeline command or other user selection. The user may interact with the timeline user interface to browse available snapshots 206, search or filter available snapshots 206, select previous snapshots 206 to activate, and/or otherwise navigate through the stored snapshots 206. As described further below, the user may navigate through the snapshots 206 by selecting a user interface element 210 associated with a particular snapshot 206, by selecting a particular date and time, by entering one or more search terms or other search commands, by selecting one or more media transport controls (e.g., play, pause, rewind, fast-forward, video scrubbing, or other controls), or by selecting any other appropriate user interface control. In block 326, the computing device 102 determines whether a user timeline command has been received. If not, the method 300 loops back to block 302 to continue creating snapshots 206 of the user computing context 202. Thus, the computing device 102 may continually, periodically, responsively, or otherwise repeatedly create and store snapshots 206 of the user's computing context 202. Referring back to block 326, if a user timeline command has been received, the method 300 advances to block 328.

In block 328, the computing device 102 loads a selected snapshot 206 from the persistent memory 128 into the volatile memory 126 (if necessary). The snapshot 206 may be selected, for example, in response to a user selection of a sync point associated with the snapshot 206, a search command that matches the snapshot 206, or a media transport command that reaches the snapshot 206 (e.g., rewind, fast-forward, or timeline scrubbing). Once the snapshot 206 is loaded into the volatile memory 126, the user computing context 202 associated with that snapshot may be activated as described below. As described above, the snapshots 206 may be stored partially or completely in the persistent memory 128. Because persistent memory 128 is typically much faster than the data storage device 130, storing part or all of the snapshot 206 data in the persistent memory 128 may improve performance as compared to storing the snapshot 206 data in the data storage device 130. Of course, in some embodiments the computing device 102 may additionally or alternatively store part or all of the snapshot 206 data in the data storage device 130. The particular type and amount of snapshot 206 data stored in the volatile memory 126, the persistent memory 128 and/or the data storage device 130 may vary between embodiments. For example, data that is relatively small but requires low latency may preferably be stored in the volatile memory 126.

In some embodiments, in block 330, the computing device 102 may also load one or more adjacent snapshots 206 from the persistent memory 128 into the volatile memory 126. For example, the computing device 102 may load snapshots 206 associated with sync points that are close in time to a currently selected snapshot 206. As another example, the computing device 102 may load snapshots 206 that are likely to be loaded in the future based on media transport controls activated by the user (e.g., a rewind control or a timeline scrubber control). By loading adjacent snapshots 206, the computing device 102 may reduce latency and otherwise improve performance associated with accessing the snapshots 206.

In block 332, the computing device 102 activates the computing context 202 stored by the selected snapshot 206. Activating the selected snapshot 206 allows the user to view, edit, or otherwise interact with the applications, documents, and other content of the user computing context 202 associated with the selected snapshot 206. The particular interactions available with a computing context 202 may depend on the contents or format of the snapshot 206. The computing device 102 may use the selected snapshot 206 as the active computing environment of the computing device 102, for example by replacing the user's current desktop. As another example, the computing device 102 may replicate the applications, windows, and window arrangement of the snapshot 206, but the contents of associated documents may reflect the most recent version of those documents. For example, the timeline user interface may include a "switch to present" command to bring all viewed documents (including Web links) up to their current state while retaining the relative arrangement or other layout of the documents. In some embodiments, the active snapshot 206 may be presented with the timeline user interface, for example as a subwindow, frame, or other embedded view within the timeline user interface. The computing device 102 may record an additional snapshot 206 for the current computing context 202 prior to activating the selected snapshot 206, to allow the user to return to the current computing context 202. The computing device 102 may use any appropriate technique to activate the snapshot 206, based on the format of the snapshot 206.

In some embodiments, in block 334 the computing device 102 may replay logged metadata associated with the selected snapshot 206. The computing device 102 may start from a known previous snapshot 206 of the user's computing context 202, for example stored as memory contents in a virtual machine, and then generate application events, file system events, or other events based on the logged metadata.

In some embodiments, in block 336 the computing device 102 may load a memory snapshot 206 stored in a virtual machine. As described above, the computing device 102 may load the memory snapshot 206 using a process similar to live-migrating virtual machines between hosts. After loading the memory snapshot 206, the applications, documents, and other programs of the user computing context 202 of the selected snapshot 206 may begin to execute.

In some embodiments, in block 338 the computing device 102 may transfer data from the user computing context 202 of the selected snapshot 206 into the current computing context 202 of the computing device 102. The transferred data may include documents, applications, or other content of the selected user computing context 202. For example, the user may browse or otherwise view content of the selected user computing context 202. As another example, the user may transfer a previous version of a document to the current context of the computing device 102 in order to recover the contents of the previous version. The computing device 102 may use any technique to transfer the data. For example, the computing device 102 may allow the user to cut and paste data using a system clipboard. As another example, the computing device 102 may allow the user to transfer files using a network drive or other specialized volume. As still another example, the computing device 102 may perform optical character recognition on the visual representation (e.g., on recorded screencast video) to recover textual contents of the selected user computing context 202. Additionally, in some embodiments the user may share the contents of the selected user computing context 202 with another user, for example by sharing a virtual machine snapshot 206 to provide the other user with the same computing context 202.

In some embodiments, in block 340 the computing device 102 may create a new timeline branch starting with the selected snapshot 206. For example, the computing device 102 may create new versions for one or more documents associated with the selected snapshot 206. Additionally or alternatively, the computing device 102 may prompt or otherwise query the user if the user attempts to edit a prior version of a document. After activating the selected snapshot 206, the method 300 loops back to block 302 to continue monitoring the user computing context 202. Additionally or alternatively, it should be understood that in some embodiments the computing device 102 may activate or otherwise display additional snapshots 206 prior to looping back to block 302 and creating a new snapshot 206. For example, the computing device 102 may activate multiple snapshots 206 while the user rewinds or scrubs through the timeline user interface.

Figure 4:
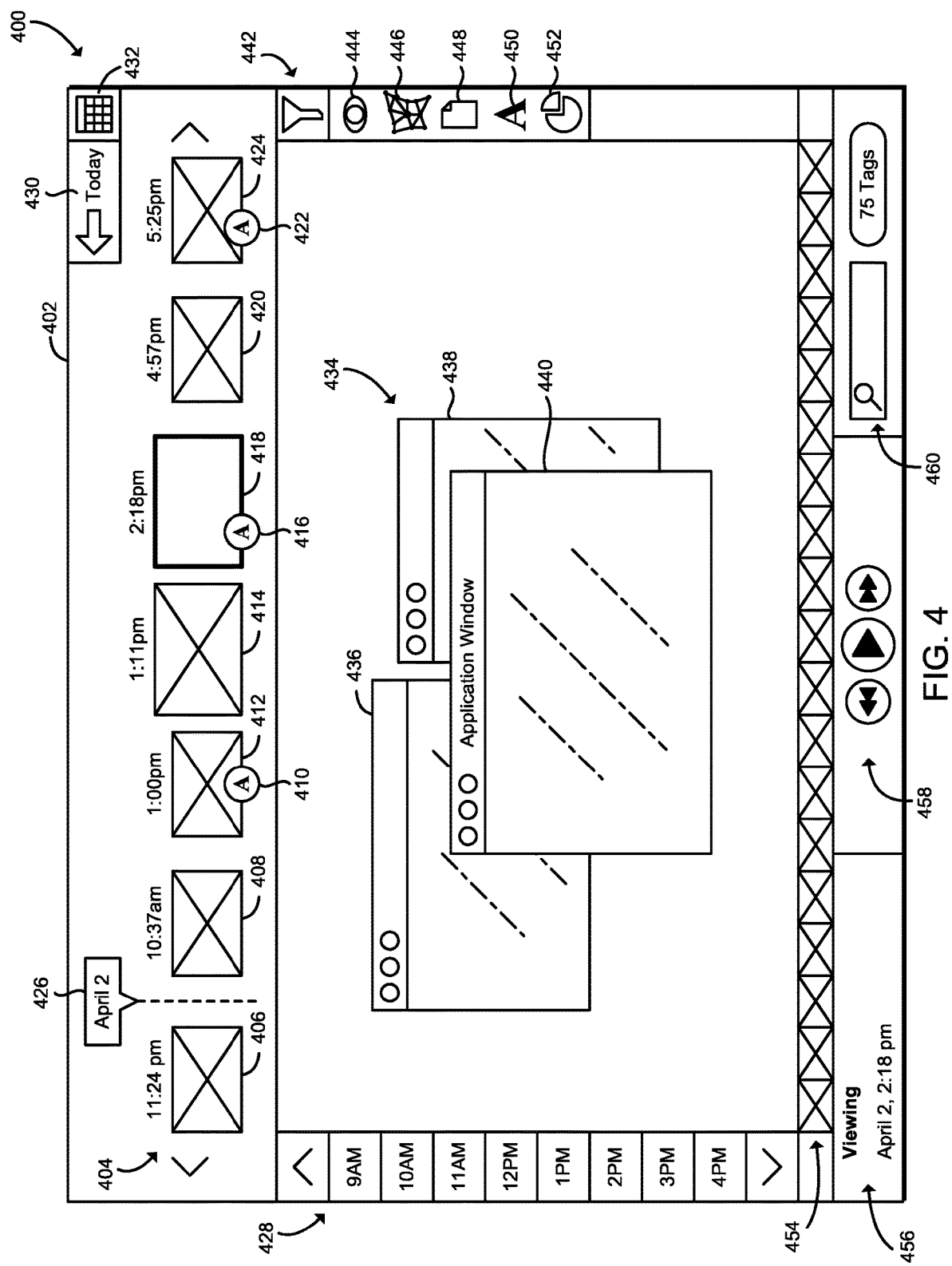
FIG. 4 is a diagram illustrating at least one embodiment of a user interface of the computing device of FIGS. 1-2.

Referring now to FIG. 4, diagram 400 illustrates one potential embodiment of a timeline user interface that may be established by the computing device 102. In the illustrative embodiment, a window 402 contains the timeline user interface. The window 402 may be embodied as, for example, a native application window, a web browser window, an embedded web view, or any other user interface window. In some embodiments, the window 402 may occupy the user's entire desktop environment.

The illustrative window 402 includes a keyframe timeline 404. The keyframe timeline 404 includes a series of thumbnails 406, 408, 412, 414, 418, 420, 424 that correspond to particular sync points and include visual representations of the associated snapshots 206. Each thumbnail also displays the associated time and/or date of the corresponding sync point. Each of the thumbnails in the keyframe timeline 404 corresponds to sync point that may be important to the user, and may be selected using the salience value associated with each sync point. For example, each thumbnail may represent when the user has switched to a different application, edited a new document, or performed similar events. Additionally, the salience value of each sync point may be further shown by the relative sizes of the thumbnails. In the illustrative embodiment, the thumbnails 414, 418 are illustrated as being larger than the other thumbnails and thus have a higher associated salience value. Additionally, as shown, the thumbnail 418 is visually highlighted, indicating that the corresponding sync point is currently activated. The thumbnails 412, 418, 424 are decorated with icons 410, 416, 422, which indicate that in those sync points the same application (which may be represented by the icons 410, 416, 422) is focused and/or active. As shown, the keyframe timeline 404 further includes a date change indictor 426, which may visually indicate changes between dates.

The window 402 also includes time navigation controls, including a time selector 428, a today navigation button 430, and a calendar button 432. The time selector 428 allows the user to directly specify particular times. Upon selecting a particular time, the computing device 102 may update the keyframe timeline 404 based upon the selected time. In some embodiments, the computing device 102 may directly activate a sync point corresponding to the selected time. Similarly, the today navigation button 430 and the calendar button 432 may be used to select particular sync points based on date.

The window 402 includes a computing context view 434. The computing context view 434 may include an interactive or non-interactive view of a selected user computing context 202 of the computing device 102. For example, in the illustrative embodiment, the computing context view 434 includes three application windows 436, 438, 440. The computing context view 434 may display the user computing context 202 of the computing device 102 while the user is operating the computing device 102, for example by displaying the current contents of the user's desktop environment. The computing context view 434 may also display a user computing context 202 loaded from a snapshot 206, for example in response to a user selection of a sync point or in response to the user rewinding, scrubbing, or otherwise navigating through the timeline user interface. In some embodiments, the computing context view 434 may occupy the user's entire desktop environment and/or entire display 134. In those embodiments, the computing context view 434 may shrink, move, be obscured, or otherwise be modified in response to a user command to access the timeline user interface.

The window 402 includes a filter control 442. The filter control 442 may allow the user to filter and otherwise select what sync points appear in the keyframe timeline 404. For example, the user may specify particular filter criteria and only matching sync points will be displayed in the keyframe timeline 404. Illustratively, the filter control 442 includes an eye tracking filter 444, an activity filter 446, a document name filter 448, a current application filter 450, and a productivity filter 452. Of course, additional or alternative filters may be available in other embodiments. The eye tracking filter 446 may, for example, restrict retrieved context data to only items that the user has looked at for a minimum period of time. The productivity filter 452 may, for example, retrieve context data related to work documents in order to avoid review of extraneous information for a given search.

The window 402 further includes a timeline scrubber 454. The timeline scrubber 454 may allow the user to browse through available sync points (with corresponding snapshots 206) by dragging, swiping, or otherwise selecting various points on the timeline scrubber 454. In response to selections on the timeline scrubber, the computing device 102 may update the keyframe timeline 404 and/or the computing context view 434. In some embodiments, the timeline scrubber 454 may provide visual representations (e.g. thumbnails) and allow access to all sync points in a particular time period. Unlike the keyframe timeline 404, the timeline scrubber 454 may allow access to all sync points without regard to the associated salience value of the sync point. For example, in the illustrative embodiment the timeline scrubber 454 allows the user to scrub through one entire day's worth of sync points (and corresponding snapshots 206).

The window 402 includes a date/time display 456. The date/time display 456 displays the date and time of the currently selected sync point and changes dynamically in response to timeline navigation. For example, as shown, the date/time display 456 matches the date and time of the currently selected thumbnail 418 of the keyframe timeline 404.

The window 402 includes media transport controls 458, which are illustratively embodied as a rewind button, a play/pause button, and a fast-forward button. The user may select the media transport controls to browse through available sync points. In response to a selection of a media transport control the computing device 102 may activate a series of sync points (and their corresponding snapshots 206) and dynamically update the keyframe timeline 404, the computing context view 434, the timeline scrubber 454, and/or the date/time display 456. For example, in response to selection of the rewind button, the computing device 102 may display snapshots 206 in the computing context view 434 moving backward through time and update the other timeline controls 404, 454, 456 appropriately.

Lastly, the window 402 also includes a search control 460. The search control 460 allows the user to enter one or more search terms which may be used to search for particular sync points and/or associated documents. The computing device 102 may search content data, keywords, metadata, tag data, or other data associated with the saved snapshots 206. After searching, the keyframe timeline 404 or other components of the timeline user interface may be limited or focused to matching sync points. As shown, the illustrative search control 460 includes a textual search field and a tags button. However, it should be understood that other search modalities may be used in some embodiments. For example, in some embodiments, the computing device 102 may allow speech input for search terms. As another example, in some embodiments, the computing device 102 may provide for visual search. In that example, the user may provide an image, and the computing device 102 searches for snapshots 206 that match or are similar to that image, for example by analyzing stored video data of the snapshots 206.

Figure 5:
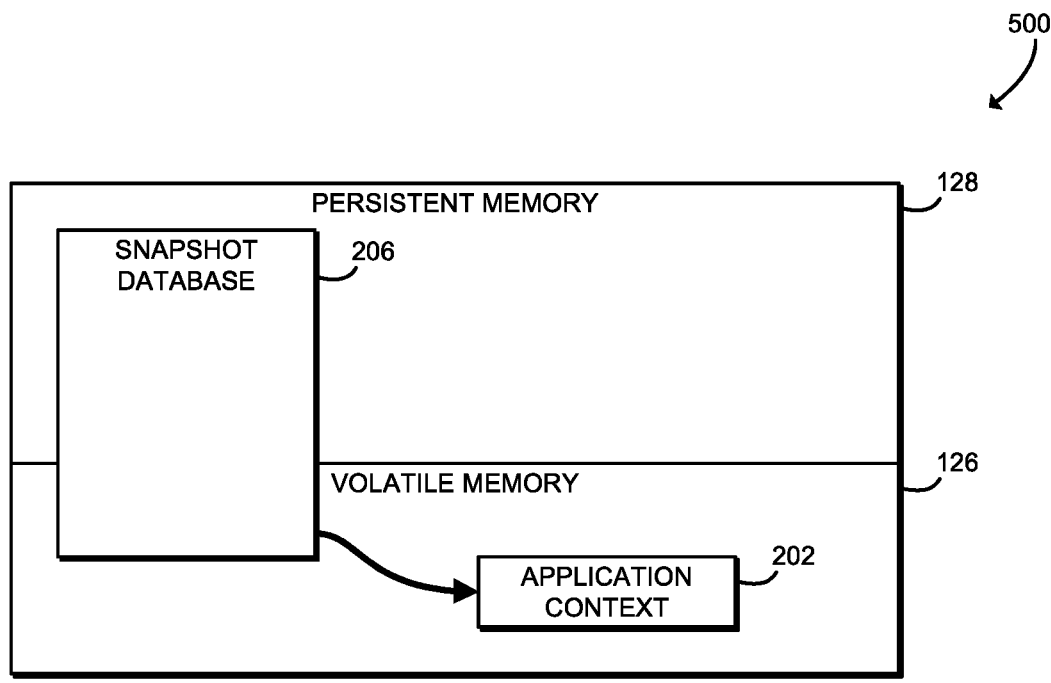
FIG. 5 is a schematic diagram illustrating memory structures that may be established by the computing device of FIGS. 1 and 2.

Referring now to FIG. 5, schematic diagram 500 illustrates at least one potential embodiment of memory structures that may be established by the computing device 102. As shown, in the illustrative embodiment, the snapshots 206 are stored in a database that is partially stored in the persistent memory 128 and partially stored in the volatile memory 126. For example, the snapshot database 206 may store metadata associated with application and/or user events, as described above in connection with block 304 of FIG. 3. As shown, when a snapshot 206 is selected and activated, the contents of the snapshot database 206 are loaded into an application context of the user computing context 202, which is contained in the volatile memory 126.

Snapshot data may be moved within the snapshot database 206 from the persistent memory 128 to the volatile memory 126 to allow low-latency access to snapshots 206. For example, in some embodiments the computing device 102 may monitor the user's progress through the timeline user interface and load snapshots 206 from the slower persistent memory 128 to the faster volatile memory 126 as the user approaches a given time period.

Figure 6:
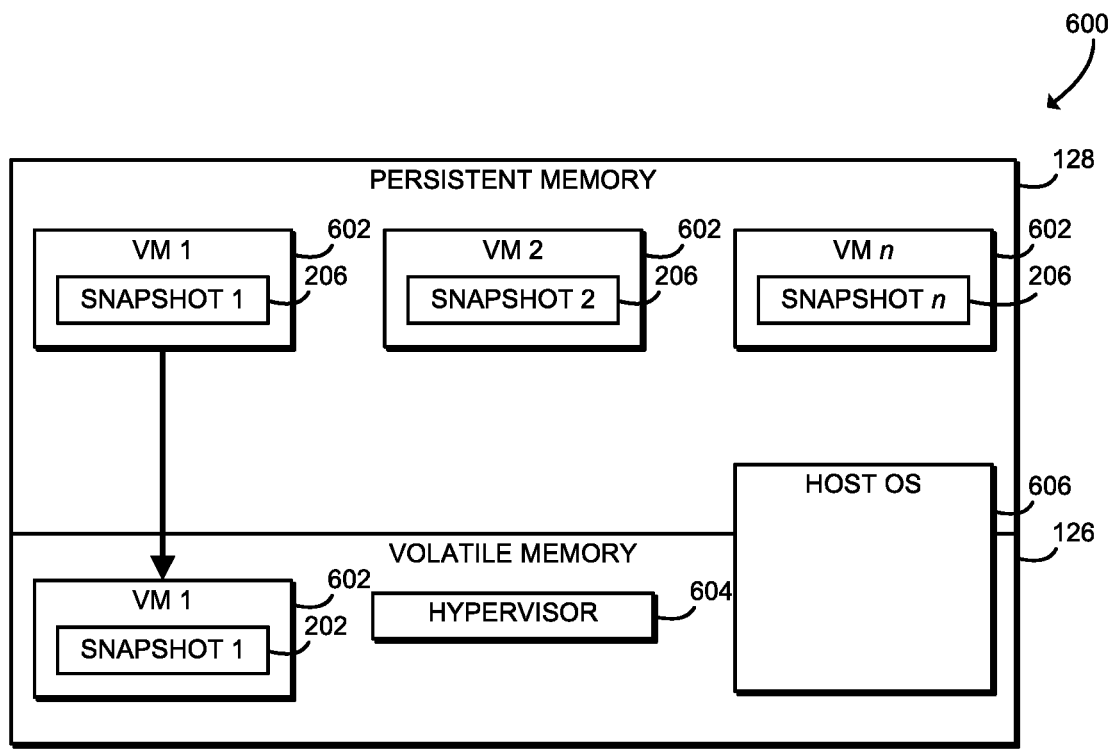
FIG. 6 is a schematic diagram illustrating additional memory structures that may be established by the computing device of FIGS. 1 and 2.

Referring now to FIG. 6, a schematic diagram 600 illustrates at least one potential embodiment of memory structures that may be established by the computing device 102. As shown, the snapshots 206 are each stored in virtual machines 602 that are stored in the persistent memory 128. When a snapshot 206 is selected and activated, a hypervisor 604 and/or host operating system 606 may load the contents of the virtual machine 602 from the persistent memory 128 into the volatile memory 126 and activate the snapshot 206 as the current user computing context 202. For example, in the illustrative embodiment, the computing device 102 has loaded virtual machine 1 into the volatile memory 126, and the contents of snapshot 1 have been activated as the current user computing context 202. In some embodiments, the computing device 102 (e.g., by the hypervisor 604 and/or the host operating system 606) may dynamically allocate space in the volatile memory 126 for a given virtual machine 602 as the user approaches that sync point in the user timeline interface. Thus, virtual machines 602 may be allocated and de-allocated dynamically as the user moves through the timeline. As described above, the snapshots 206 associated with the virtual machines 602 may be used standalone or in combination with file system or other event logging to recreate the full user computing context 202.

EXAMPLES

Illustrative examples of the technologies disclosed herein are provided below. An embodiment of the technologies may include any one or more, and any combination of, the examples described below.

Example 1 includes a computing device for user computing context replay, the computing device comprising snapshot generator circuitry to create a plurality of snapshots, wherein each of the snapshots is indicative of a user computing context at a corresponding point in time; snapshot browser circuitry to (i) present a timeline user interface based on the plurality of snapshots, wherein the timeline user interface includes a plurality of elements, and wherein each element is associated with a corresponding sync point, wherein each sync point corresponds to a point in time and (ii) receive a user selection indicative of a first selected sync point in response to a presentation of the timeline user interface, wherein the first selected sync point corresponds to a first selected snapshot of the plurality of snapshots; and timeline coordinator circuitry to activate a first user computing context that corresponds to the first selected snapshot in response to a receipt of the user selection.

Example 2 includes the subject matter of Example 1, and wherein the user computing context comprises application state data associated with one or more user applications.

Example 3 includes the subject matter of any of Examples 1 and 2, and wherein to create the plurality of snapshots comprises to log metadata associated with user-interaction events of the user computing context; and to activate the user computing context comprises to replay the metadata of the first selected snapshot.

Example 4 includes the subject matter of any of Examples 1-3, and wherein to create the plurality of snapshots comprises to receive metadata indicative of the user computing context from a remote computing device.

Example 5 includes the subject matter of any of Examples 1-4, and wherein to create the plurality of snapshots comprises to create a virtual machine memory snapshot that corresponds to each of the plurality of snapshots; and to activate the user computing context comprises to load the virtual machine memory snapshot.

Example 6 includes the subject matter of any of Examples 1-5, and wherein to create the plurality of snapshots comprises to capture video data indicative of the user computing context; and to activate the user computing context comprises to display the video data corresponding to the first selected snapshot.

Example 7 includes the subject matter of any of Examples 1-6, and wherein to create the plurality of snapshots comprises to cache network resources associated with the user computing context.

Example 8 includes the subject matter of any of Examples 1-7, and wherein to create the plurality of snapshots comprises to apply security restrictions to the user computing context.

Example 9 includes the subject matter of any of Examples 1-8, and further including a persistent memory and a volatile memory, wherein the snapshot generator circuitry is further to store at least a part of the plurality of snapshots in the persistent memory.

Example 10 includes the subject matter of any of Examples 1-9, and wherein to activate the first user computing context that corresponds to the first selected snapshot comprises to load the first user computing context from the persistent memory into the volatile memory.

Example 11 includes the subject matter of any of Examples 1-10, and wherein the timeline coordinator circuitry is further to select a second selected snapshot of the plurality of snapshots based on a relationship between the second selected snapshot and the first selected snapshot; and load a second user computing context that corresponds to the second selected snapshot from the persistent memory into the volatile memory in response to an activation of the first user computing context.

Example 12 includes the subject matter of any of Examples 1-11, and wherein to activate the first user computing context comprises to transfer data from the first user computing context to a current user computing context.

Example 13 includes the subject matter of any of Examples 1-12, and wherein to activate the first user computing context comprises to create a timeline branch that starts at the first user computing context.

Example 14 includes the subject matter of any of Examples 1-13, and wherein each element of the timeline user interface comprises a visual representation of a corresponding snapshot of the plurality of snapshots.

Example 15 includes the subject matter of any of Examples 1-14, and wherein the snapshot browser circuitry is further to analyze the plurality of snapshots to determine a salience value associated with the sync point corresponding to each of the plurality of snapshots; wherein to present the timeline user interface comprises to display a visual indication of the salience value associated with the sync point that corresponds to each of the plurality of elements of the timeline user interface.

Example 16 includes the subject matter of any of Examples 1-15, and wherein to analyze the plurality of snapshots to determine the salience value associated with the sync point that corresponds to each of the plurality of snapshots comprises to analyze the visual representation of the corresponding snapshot to determine visual distinctiveness of the visual representation.

Example 17 includes the subject matter of any of Examples 1-16, and wherein the visual representation of the corresponding snapshot of the plurality of snapshots comprises a visual indication of a characteristic of a document of the corresponding snapshot.

Example 18 includes the subject matter of any of Examples 1-17, and wherein the characteristic of the document comprises an associated application, visual distinctiveness of elements within the document, or a related topic to the document.

Example 19 includes the subject matter of any of Examples 1-18, and wherein the visual representation of the corresponding snapshot of the plurality of snapshots comprises a visual indication of a usage factor of the corresponding snapshot.

Example 20 includes the subject matter of any of Examples 1-19, and wherein the usage factor comprises an elapsed time editing, an elapsed time with window focus, or a document sharing attribute.

Example 21 includes the subject matter of any of Examples 1-20, and wherein the snapshot browser circuitry is further to receive a visual search term in response to the presentation of the timeline user interface; and perform a visual search of the plurality of snapshots based on the visual search term.

Example 22 includes the subject matter of any of Examples 1-21, and wherein to receive the user selection indicative of the first selected sync point comprises to receive a transport control command.

Example 23 includes the subject matter of any of Examples 1-22, and wherein to receive the user selection indicative of the first selected sync point comprises to receive a search command.

Example 24 includes a method for user computing context replay, the method comprising creating, by a computing device, a plurality of snapshots, wherein each of the snapshots is indicative of a user computing context at a corresponding point in time; presenting, by the computing device, a timeline user interface based on the plurality of snapshots, wherein the timeline user interface includes a plurality of elements, and wherein each element is associated with a corresponding sync point, wherein each sync point corresponds to a point in time; receiving, by the computing device, a user selection indicative of a first selected sync point in response to presenting the timeline user interface, wherein the first selected sync point corresponds to a first selected snapshot of the plurality of snapshots; and activating, by the computing device, a first user computing context corresponding to the first selected snapshot in response to receiving the user selection.

Example 25 includes the subject matter of Example 24, and wherein the user computing context comprises application state data associated with one or more user applications.

Example 26 includes the subject matter of any of Examples 24 and 25, and wherein creating the plurality of snapshots comprises logging metadata associated with user-interaction events of the user computing context; and activating the user computing context comprises replaying the metadata of the first selected snapshot.

Example 27 includes the subject matter of any of Examples 24-26, and wherein creating the plurality of snapshots comprises receiving metadata indicative of the user computing context from a remote computing device.

Example 28 includes the subject matter of any of Examples 24-27, and wherein creating the plurality of snapshots comprises creating a virtual machine memory snapshot corresponding to each of the plurality of snapshots.

Example 29 includes the subject matter of any of Examples 24-28, and wherein creating the plurality of snapshots comprises capturing video data indicative of the user computing context; and activating the user computing context comprises displaying the video data corresponding to the first selected snapshot.

Example 30 includes the subject matter of any of Examples 24-29, and wherein creating the plurality of snapshots comprises caching network resources associated with the user computing context.

Example 31 includes the subject matter of any of Examples 24-30, and wherein creating the plurality of snapshots comprises applying security restrictions to the user computing context.

Example 32 includes the subject matter of any of Examples 24-31, and further including storing, by the computing device, at least a part of the plurality of snapshots in a persistent memory of the computing device.

Example 33 includes the subject matter of any of Examples 24-32, and wherein activating the first user computing context corresponding to the first selected snapshot comprises loading the first user computing context from the persistent memory into a volatile memory of the computing device.

Example 34 includes the subject matter of any of Examples 24-33, and further including selecting, by the computing device, a second selected snapshot of the plurality of snapshots based on a relationship between the second selected snapshot and the first selected snapshot; and loading, by the computing device, a second user computing context corresponding to the second selected snapshot from the persistent memory into the volatile memory in response to activating the first user computing context.

Example 35 includes the subject matter of any of Examples 24-34, and wherein activating the first user computing context comprises transferring data from the first user computing context to a current user computing context.

Example 36 includes the subject matter of any of Examples 24-35, and wherein activating the first user computing context comprises creating a timeline branch starting at the first user computing context.

Example 37 includes the subject matter of any of Examples 24-36, and wherein each element of the timeline user interface comprises a visual representation of a corresponding snapshot of the plurality of snapshots.

Example 38 includes the subject matter of any of Examples 24-37, and further including analyzing, by the computing device, the plurality of snapshots to determine a salience value associated with the sync point corresponding to each of the plurality of snapshots; wherein presenting the timeline user interface comprises displaying a visual indication of the salience value associated with the sync point corresponding to each of the plurality of elements of the timeline user interface.

Example 39 includes the subject matter of any of Examples 24-38, and wherein analyzing the plurality of snapshots to determine the salience value associated with the sync point corresponding to each of the plurality of snapshots comprises analyzing the visual representation of the corresponding snapshot to determine visual distinctiveness of the visual representation.

Example 40 includes the subject matter of any of Examples 24-39, and wherein the visual representation of the corresponding snapshot of the plurality of snapshots comprises a visual indication of a characteristic of a document of the corresponding snapshot.

Example 41 includes the subject matter of any of Examples 24-40, and wherein the characteristic of the document comprises an associated application, visual distinctiveness of elements within the document, or a related topic to the document.

Example 42 includes the subject matter of any of Examples 24-41, and wherein the visual representation of the corresponding snapshot of the plurality of snapshots comprises a visual indication of a usage factor of the corresponding snapshot.

Example 43 includes the subject matter of any of Examples 24-42, and wherein the usage factor comprises an elapsed time editing, an elapsed time with window focus, or a document sharing attribute.

Example 44 includes the subject matter of any of Examples 24-43, and further including receiving, by the computing device, a visual search term in response to presenting the timeline user interface; and performing, by the computing device, a visual search of the plurality of snapshots based on the visual search term.

Example 45 includes the subject matter of any of Examples 24-44, and wherein receiving the user selection indicative of the first selected sync point comprises receiving a transport control command.

Example 46 includes the subject matter of any of Examples 24-45, and wherein receiving the user selection indicative of the first selected sync point comprises receiving a search command.

Example 47 includes a computing device comprising a processor; and a memory having stored therein a plurality of instructions that when executed by the processor cause the computing device to perform the method of any of Examples 24-46.

Example 48 includes one or more machine readable storage media comprising a plurality of instructions stored thereon that in response to being executed result in a computing device performing the method of any of Examples 24-46.

Example 49 includes a computing device comprising means for performing the method of any of Examples 24-46.

Example 50 includes a computing device for user computing context replay, the computing device comprising means for creating a plurality of snapshots, wherein each of the snapshots is indicative of a user computing context at a corresponding point in time; means for presenting a timeline user interface based on the plurality of snapshots, wherein the timeline user interface includes a plurality of elements, and wherein each element is associated with a corresponding sync point, wherein each sync point corresponds to a point in time; means for receiving a user selection indicative of a first selected sync point in response to presenting the timeline user interface, wherein the first selected sync point corresponds to a first selected snapshot of the plurality of snapshots; and means for activating a first user computing context corresponding to the first selected snapshot in response to receiving the user selection.

Example 51 includes the subject matter of Example 50, and wherein the user computing context comprises application state data associated with one or more user applications.

Example 52 includes the subject matter of any of Examples 50 and 51, and wherein the means for creating the plurality of snapshots comprises means for logging metadata associated with user-interaction events of the user computing context; and the means for activating the user computing context comprises means for replaying the metadata of the first selected snapshot.

Example 53 includes the subject matter of any of Examples 50-52, and wherein the means for creating the plurality of snapshots comprises means for receiving metadata indicative of the user computing context from a remote computing device.

Example 54 includes the subject matter of any of Examples 50-53, and wherein the means for creating the plurality of snapshots comprises means for creating a virtual machine memory snapshot corresponding to each of the plurality of snapshots.

Example 55 includes the subject matter of any of Examples 50-54, and wherein the means for creating the plurality of snapshots comprises means for capturing video data indicative of the user computing context; and the means for activating the user computing context comprises means for displaying the video data corresponding to the first selected snapshot.

Example 56 includes the subject matter of any of Examples 50-55, and wherein the means for creating the plurality of snapshots comprises means for caching network resources associated with the user computing context.

Example 57 includes the subject matter of any of Examples 50-56, and wherein the means for creating the plurality of snapshots comprises means for applying security restrictions to the user computing context.

Example 58 includes the subject matter of any of Examples 50-57, and further including means for storing at least a part of the plurality of snapshots in a persistent memory of the computing device.

Example 59 includes the subject matter of any of Examples 50-58, and wherein the means for activating the first user computing context corresponding to the first selected snapshot comprises means for loading the first user computing context from the persistent memory into a volatile memory of the computing device.

Example 60 includes the subject matter of any of Examples 50-59, and further including means for selecting a second selected snapshot of the plurality of snapshots based on a relationship between the second selected snapshot and the first selected snapshot; and means for loading a second user computing context corresponding to the second selected snapshot from the persistent memory into the volatile memory in response to activating the first user computing context.

Example 61 includes the subject matter of any of Examples 50-60, and wherein the means for activating the first user computing context comprises means for transferring data from the first user computing context to a current user computing context.

Example 62 includes the subject matter of any of Examples 50-61, and wherein the means for activating the first user computing context comprises means for creating a timeline branch starting at the first user computing context.

Example 63 includes the subject matter of any of Examples 50-62, and wherein each element of the timeline user interface comprises a visual representation of a corresponding snapshot of the plurality of snapshots.

Example 64 includes the subject matter of any of Examples 50-63, and further including means for analyzing the plurality of snapshots to determine a salience value associated with the sync point corresponding to each of the plurality of snapshots; wherein the means for presenting the timeline user interface comprises means for displaying a visual indication of the salience value associated with the sync point corresponding to each of the plurality of elements of the timeline user interface.

Example 65 includes the subject matter of any of Examples 50-64, and wherein the means for analyzing the plurality of snapshots to determine the salience value associated with the sync point corresponding to each of the plurality of snapshots comprises means for analyzing the visual representation of the corresponding snapshot to determine visual distinctiveness of the visual representation.

Example 66 includes the subject matter of any of Examples 50-65, and wherein the visual representation of the corresponding snapshot of the plurality of snapshots comprises a visual indication of a characteristic of a document of the corresponding snapshot.

Example 67 includes the subject matter of any of Examples 50-66, and wherein the characteristic of the document comprises an associated application, visual distinctiveness of elements within the document, or a related topic to the document.

Example 68 includes the subject matter of any of Examples 50-67, and wherein the visual representation of the corresponding snapshot of the plurality of snapshots comprises a visual indication of a usage factor of the corresponding snapshot.

Example 69 includes the subject matter of any of Examples 50-68, and wherein the usage factor comprises an elapsed time editing, an elapsed time with window focus, or a document sharing attribute.

Example 70 includes the subject matter of any of Examples 50-69, and further including means for receiving a visual search term in response to presenting the timeline user interface; and means for performing a visual search of the plurality of snapshots based on the visual search term.

Example 71 includes the subject matter of any of Examples 50-70, and wherein the means for receiving the user selection indicative of the first selected sync point comprises means for receiving a transport control command.

Example 72 includes the subject matter of any of Examples 50-71, and wherein the means for receiving the user selection indicative of the first selected sync point comprises means for receiving a search command.

The invention claimed is:
1. A compute device comprising:
at least one volatile memory;
at least one persistent memory;
snapshot generator circuitry to create a plurality of snapshots, respective ones of the snapshots indicative of a corresponding computing environment at a corresponding point in time;
snapshot browser circuitry to:
assign salience values to the plurality of snapshots; and
generate a timeline user interface, the timeline user interface including (a) a first timeline to identify the plurality of snapshots and (b) a second timeline to identify a subset of the plurality of snapshots, the snapshot browser circuitry to select the subset of the plurality of snapshots to be included in the second timeline based on the salience values, the snapshot generator circuitry to store at least a part of the plurality of snapshots in the at least one persistent memory; and
timeline coordinator circuitry to activate a first computing environment that corresponds to a first selected snapshot in response to a user selection indicative of the first selected snapshot from one of the first timeline or the second timeline, the timeline coordinator circuitry to load the first computing environment from the at least one persistent memory into the at least one volatile memory to activate the first computing environment corresponding to the first selected snapshot.

2. The compute device of claim 1, wherein the snapshot generator circuitry is to create the plurality of snapshots by logging metadata associated with user-interaction events of the corresponding computing environment; and
the timeline coordinator circuitry is to activate the first computing environment by replaying the metadata of the first selected snapshot.

3. The compute device of claim 1, wherein the timeline coordinator circuitry is to activate the first computing environment by loading a virtual machine memory snapshot.

4. The compute device of claim 1, wherein:
the snapshot generator circuitry is to create the plurality of snapshots based on video data indicative of the corresponding computing environment; and
the timeline coordinator circuitry is to activate the first computing environment by causing the video data corresponding to the first selected snapshot to be displayed.

5. The compute device of claim 1, wherein the timeline coordinator circuitry is further to:
select a second selected snapshot of the plurality of snapshots based on a relationship between the second selected snapshot and the first selected snapshot; and
load a second computing environment that corresponds to the second selected snapshot from the at least one persistent memory into the at least one volatile memory in response to activation of the first computing environment.

6. The compute device of claim 1, wherein the second timeline includes a visual representation of a corresponding snapshot of the subset of the plurality of snapshots.

7. The compute device of claim 6, wherein the visual representation of the corresponding snapshot of the subset of the plurality of snapshots includes a visual indication of a characteristic of a document of the corresponding snapshot.

8. The compute device of claim 6, wherein the visual representation of the corresponding snapshot of the subset of the plurality of snapshots includes a visual indication of a usage factor of the corresponding snapshot.

9. The compute device of claim 1, wherein
the second timeline includes a visual indication of the salience value assigned to each of the plurality of snapshots of the subset.

10. The compute device of claim 1, wherein the snapshot browser circuitry is further to
perform a visual search of one or more of the plurality of snapshots of the first timeline or the subset of the plurality of snapshots of the second timeline in response to a visual search term input.

11. The compute device of claim 1, wherein the user selection includes a transport control command.

12. The compute device of claim 1, wherein the snapshot generator circuitry is to create the plurality of snapshots by creating a disk snapshot of content of corresponding to each of the plurality of snapshots.

13. A method comprising:
creating, by a computing device, a plurality of snapshots, respective ones of the snapshots indicative of a corresponding computing environment at a corresponding point in time;
storing, by the computing device, at least a part of the plurality of snapshots in a persistent memory of the computing device;
assigning, by the computing device, salience values to the plurality of snapshots;
selecting, by the computing device, a subset of the plurality of snapshots based on the salience values;
generating, by the computing device, a timeline user interface, the timeline user interface including (a) a first timeline to identify the plurality of snapshots and (b) a second timeline to identify the subset of the plurality of snapshots; and
activating, by the computing device and in response to a user selection indicative of a first selected snapshot from one of the first timeline or the second timeline, a first computing environment corresponding to the first selected snapshot by loading the first computing environment from the persistent memory into a volatile memory of the computing device.

14. The method of claim 13, wherein:
creating the plurality of snapshots includes logging metadata associated with user-interaction events of the corresponding computing environment; and
activating the first computing environment includes replaying the metadata of the first selected snapshot.

15. The method of claim 13, wherein the second timeline includes a visual representation of a corresponding snapshot of the subset of the plurality of snapshots.

16. The method of claim 15, further comprising including:
performing, by the computing device, a visual search of one or more of the plurality of snapshots of the first timeline or the subset of the plurality of snapshots of the second timeline in response to a visual search term input.

17. The method of claim 13,
wherein the second timeline includes a visual indication of the salience value assigned to each of the plurality of snapshots of the subset.

18. The method of claim 13, wherein creating the plurality of snapshots further includes creating a disk snapshot of content corresponding to each of the plurality of snapshots.

19. One or more non-transitory, computer-readable storage media comprising a plurality of instructions that, when executed, cause a computing device to:
create a plurality of snapshots, respective ones of the snapshots indicative of a corresponding computing environment at a corresponding point in time;
store at least a part of the plurality of snapshots in a persistent memory of the computing device;
assign salience values to the plurality of snapshots;
select a subset of the plurality of snapshots based on the salience values;
generate a timeline user interface, the timeline user interface including (a) a first timeline to identify the plurality of snapshots and (b) a second timeline to identify the subset of the plurality of snapshots; and
in response a user selection indicative of a first selected snapshot from one of the first timeline or the second timeline, activate a first computing environment corresponding to the first selected snapshot from the persistent memory into a volatile memory of the computing device.

20. The one or more non-transitory, computer-readable storage media of claim 19, wherein the instructions, when executed, cause the computing device to:

create the plurality of snapshots by logging metadata associated with user-interaction events of the corresponding computing environment; and activate the first computing environment by replaying the metadata of the first selected snapshot.

21. The one or more non-transitory, computer-readable storage media of claim 19, wherein the second timeline includes a visual representation of a corresponding snapshot of the subset of the plurality of snapshots.

22. The one or more non-transitory, computer-readable storage media of claim 19, wherein the second timeline includes a visual indication of the salience value assigned to each of the plurality of snapshots of the subset.

23. The one or more non-transitory, computer-readable storage media of claim 19, wherein the instructions, when executed, cause the computing device to perform a visual search of one or more of the plurality of snapshots of the first timeline or the subset of the plurality of snapshots of the second timeline in response to a visual search term input.

24. The one or more non-transitory, computer-readable storage media of claim 19, wherein the instructions, when executed, cause the computing device to create the plurality of snapshots by creating a disk snapshot of content corresponding to each of the plurality of snapshots.

\* \* \* \* \*